United States Patent
Moore et al.

(10) Patent No.: US 9,787,364 B2
(45) Date of Patent: Oct. 10, 2017

(54) MULTI-USE WIRELESS POWER AND DATA SYSTEM

(71) Applicant: TRIUNE IP, LLC, Plano, TX (US)

(72) Inventors: Kenneth E. Moore, Plano, TX (US); Petru Emanuel Stingu, Plano, TX (US); Ross E. Teggatz, Plano, TX (US)

(73) Assignee: TRIUNE IP, LLC, Plano, TX (US)

( * ) Notice: Subject to any disclaimer, the term of this patent is extended or adjusted under 35 U.S.C. 154(b) by 0 days.

(21) Appl. No.: 14/814,379

(22) Filed: Jul. 30, 2015

(65) Prior Publication Data

US 2015/0341087 A1 Nov. 26, 2015

Related U.S. Application Data

(63) Continuation-in-part of application No. 14/798,700, filed on Jul. 14, 2015, which is a continuation of application No. 13/355,416, filed on Jan. 20, 2012, now Pat. No. 9,083,391.

(60) Provisional application No. 61/434,622, filed on Jan. 20, 2011, provisional application No. 62/031,027, filed on Jul. 30, 2014.

(51) Int. Cl.
*H01F 38/14* (2006.01)
*H04B 5/00* (2006.01)
*H04B 1/40* (2015.01)
*H02J 5/00* (2016.01)
*H02J 50/40* (2016.01)
(Continued)

(52) U.S. Cl.
CPC ............ *H04B 5/0031* (2013.01); *H01F 38/14* (2013.01); *H02J 5/005* (2013.01); *H02J 50/12* (2016.02); *H02J 50/40* (2016.02); *H02J 50/80* (2016.02); *H04B 1/40* (2013.01); *H04B 5/0037* (2013.01); *H04B 5/0093* (2013.01)

(58) Field of Classification Search
CPC ...... H04B 1/40; H04B 5/0031; H04B 5/0037; H04B 5/0093; H01F 38/14; H02J 5/005; H02J 7/025
USPC ........................................................ 307/104
See application file for complete search history.

(56) References Cited

U.S. PATENT DOCUMENTS 9,118,357 B2 * 8/2015 Tseng .................... H04B 5/0037
9,407,106 B2 * 8/2016 Redding ................. H02J 5/005
(Continued)

FOREIGN PATENT DOCUMENTS

WO 2012/019011 A1 2/2012
WO 2013/151831 A1 10/2013

OTHER PUBLICATIONS

Federal Institute of Industrial Property (Russian Patent Office); International Search Report and Written Opinion; PCT Application No. PCT/US2015/042903; Dec. 10, 2015.

*Primary Examiner* — Hal Kaplan
(74) *Attorney, Agent, or Firm* — Jackson Walker LLP; Christopher J. Rourk

(57) ABSTRACT

A wireless device is disclosed that includes an antenna system comprising at least one inductive element and two or more capacitive elements. A switching component configured to change a circuit configuration of the capacitive elements. A controller configured to transmit a signal using the antenna system and to receive a response from a first device, to determine a communications protocol associated with the first device and to change a configuration of the antenna system in response to the detected communications protocol by actuating the switching component.

16 Claims, 9 Drawing Sheets

(51) Int. Cl.
*H02J 50/12* (2016.01)
*H02J 50/80* (2016.01)

(56) References Cited

U.S. PATENT DOCUMENTS

| | | |
|---|---|---|
| 2012/0242160 A1 | 9/2012 | Tseng |
| 2013/0285603 A1* | 10/2013 | Zeinstra ................. H02J 7/025 320/108 |
| 2014/0152119 A1 | 6/2014 | Endo et al. |
| 2015/0236528 A1 | 8/2015 | Kim et al. |

* cited by examiner

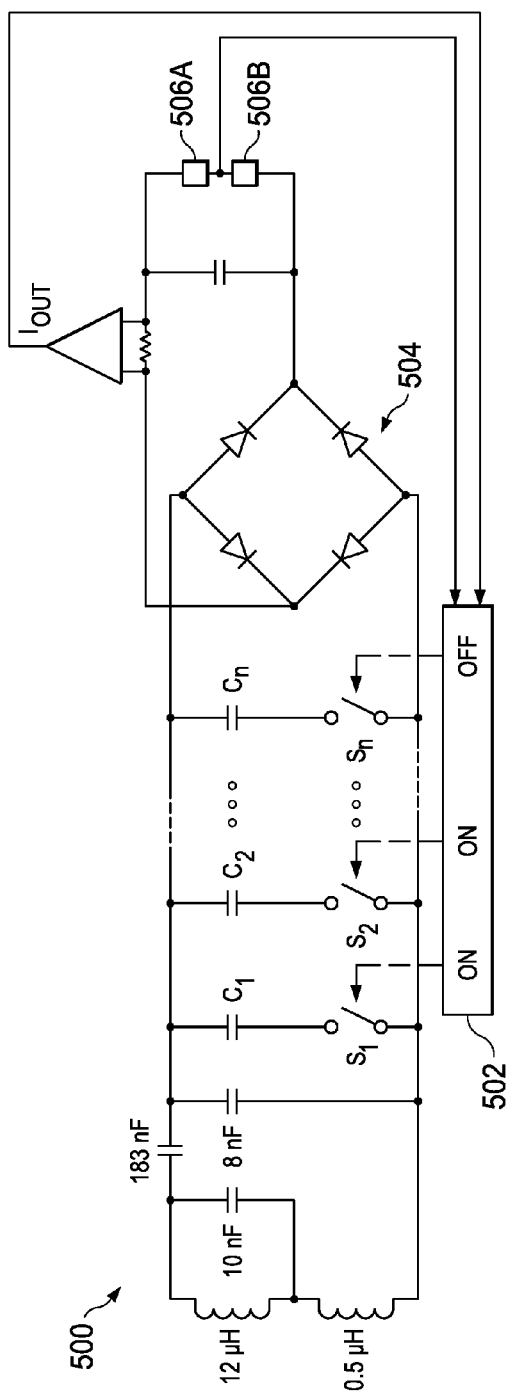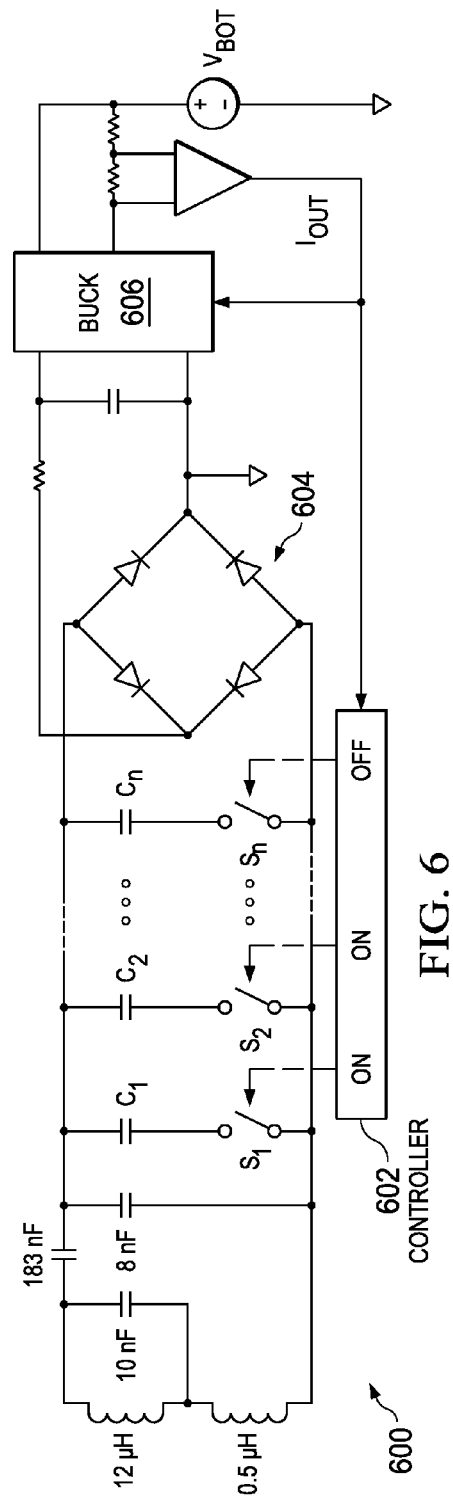
FIG. 5
FIG. 6

MULTI-USE WIRELESS POWER AND DATA SYSTEM

RELATED APPLICATIONS

The present application claims priority to U.S. Provisional Patent Application No. 62/031,027, filed Jul. 30, 2014, and U.S. patent application Ser. No. 14/798,700, filed Jul. 14, 2015, U.S. patent application Ser. No. 13/355,416, filed Jan. 20, 2012, and claims benefit of U.S. Provisional Application No. 61/434,622, filed Jan. 20, 2011, each of which is hereby incorporated by reference for all purposes as if set forth herein in its entirety.

TECHNICAL FIELD

The present disclosure relates generally to power and data transfer between two devices through a magnetic or radio frequency (RF) interface.

BACKGROUND OF THE INVENTION

Devices that are used for wirelessly transmitting data are typically design to a predetermined standard for use with other devices that are designed to the same standard. Devices that are built to different standards cannot interact with each other.

SUMMARY OF THE INVENTION

A wireless device is disclosed that includes an antenna system that has at least one inductive element and two or more capacitive elements. A switching component changes a circuit configuration of the capacitive elements. A controller transmits a signal using the antenna system and receives a response from a first device, to determine a communications protocol associated with the first device and to change a configuration of the antenna system in response to the detected communications protocol by actuating the switching component.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 5 is a diagram of a system that is configured to resonate at two different frequencies, in accordance with an exemplary embodiment of the present disclosure;

FIG. 6 is a diagram of a system with a step-down DC/DC switching converter, in accordance with an exemplary embodiment of the present disclosure;

DETAILED DESCRIPTION OF THE INVENTION

Figure 1A:
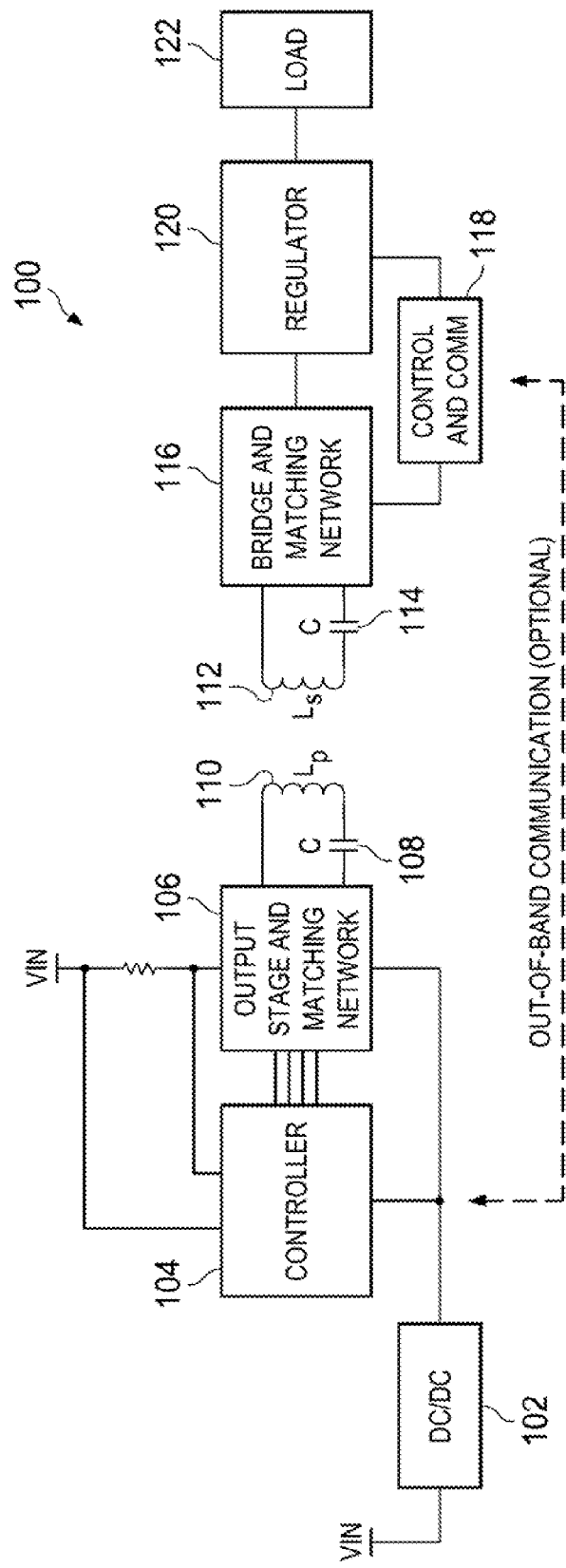
FIG. 1A is a diagram of a system for wireless power and data transmission in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The present disclosure is directed to a device for transferring power and data that can detect and use multiple different data standards and protocols, so as to be usable with different devices from different manufacturers. The disclosed multi-standard device includes a programmable controller that receives and processes data that can be encoded using any of one or more different standards or protocols, and has components that are used to transmit and receive power signals, data signals or a suitable combination of both, using electromagnetic radiation, magnetic flux or a suitable combination of energy sources. The multi-standard device can determine a data or power transmission standard or protocol that is being used by another device through the disclosed algorithmic processes, and can adjust its operating functions to allow it to interact using the detected standards or protocols.

The disclosed system can use multiple protocols to accomplish power or data transfer, where at least one of the devices can operate under multiple uses, such as under different standards, under different power or data protocols, under different distance protocols, under different safety conditions and so forth. In one exemplary embodiment, the device of the present disclosure is configured to interoperate with another device capable of only operating under a single standard, protocol or use mode.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1A is a diagram of a system 100 for wireless power and data transmission in accordance with an exemplary embodiment of the present disclosure. System 100 includes programmable controller 104, output stage and matching network 106 and bridge and matching network 116 (which form a power stage capable of transmitting power and data across the interface to a load 122), power supply 102, a resonant antenna system that includes capacitors 108 and 114 and inductors $L_P$ 110 and $L_S$ 112, control and communication circuit 118 and regulator 120, which are used to measure voltages and currents in the system. Component values for the circuitry are chosen to provide system operation across predetermined standards and application requirements supported by the device.

In operation, a primary transceiver such as output stage and matching network 106 monitors the region around an antenna, such as using capacitor 106 and inductor $L_P$ 110, to determine when a secondary transceiver such as bridge and matching network 116 is nearby, such as by measuring a change in impedance at a predetermined frequency, induced voltages or other suitable signals. Once the proximity of a secondary transceiver is detected, the primary transceiver transmits a predetermined amount of power to energize the secondary transceiver, which can be referred to herein as the "ping" phase. After the secondary transceiver begins operation, the primary transceiver and secondary transceiver transmit and receive data to in accordance with one or more algorithms to exchange identification and to select a protocol to use for power and data transfer. One method for transmitting and receiving data is by use of bi-directional communication through amplitude load modulation, frequency modulation, RF, infrared or other light-based signaling, or other suitable methods.

Figure 1B:
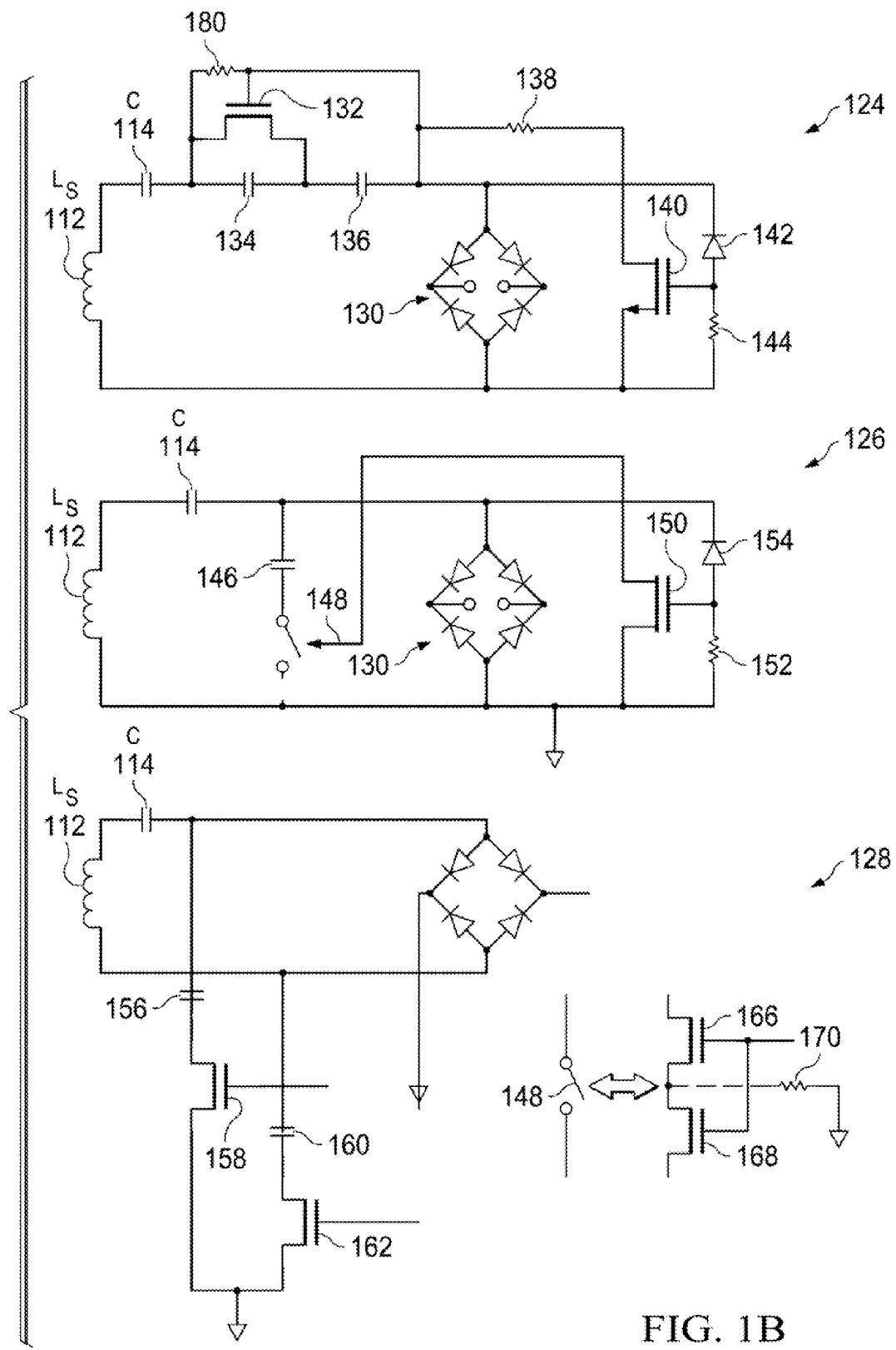
FIG. 1B is a diagram of different exemplary topologies for protecting a wireless power receiver from over-voltages using the de-tuning of the resonant circuit to keep the rectified voltage to safe levels.

The secondary transceiver can be protected from overvoltage by changing a resonant state of a tunable circuit, such as that formed by capacitor 114 and inductor $L_S$ 112, by switching capacitance elements into or out of the tunable circuit. FIG. 1B is a diagram of different exemplary topologies for protecting a wireless power receiver from overvoltages using the de-tuning of the resonant circuit to keep the rectified voltage to safe levels. In one exemplary embodiment, the tunable circuit can include a sensor (such as within bridge and matching network 116, control and communication circuit 118, regulator 120 or other suitable circuits) that senses an AC voltage at an input to a bridge rectifier, such as bridge rectifier 130, and when that voltage reaches a pre-determined level, the sensor and associated control circuitry can connect or disconnect one or more capacitive elements to change the resonant frequency of the tunable circuit from the transmitter frequency of the primary transceiver, thereby reducing the energy in the receiver coil. For example, secondary transceiver 124 can include resistor 180 and transistor 132, which switches capacitor 134 in or out of series with capacitor 136, as a function of the state of transistor 140, which is turned on or off as a function of a voltage drop across resistor 144 driven by diode 142 and a corresponding voltage drop across resistor 138 when transistor 140 is on or off.

In another exemplary embodiment, secondary transceiver 126 can include switch 148, which switches capacitor 146 in and out of series with capacitor 114 as a function of the state of transistor 150, which is controlled by a voltage drop across resistor 152 that is driven by diode 154. An exemplary detail diagram of switch 148 is shown by transistors 166 and 168, which have a common gate and center connection to low voltage through 170.

In another exemplary embodiment, secondary transceiver 128 can include capacitors 156 and 160, which are switched in and out of series with capacitor 114 by transistors 158 and 162. Likewise, other suitable configurations can also or alternatively be used.

Figure 2:
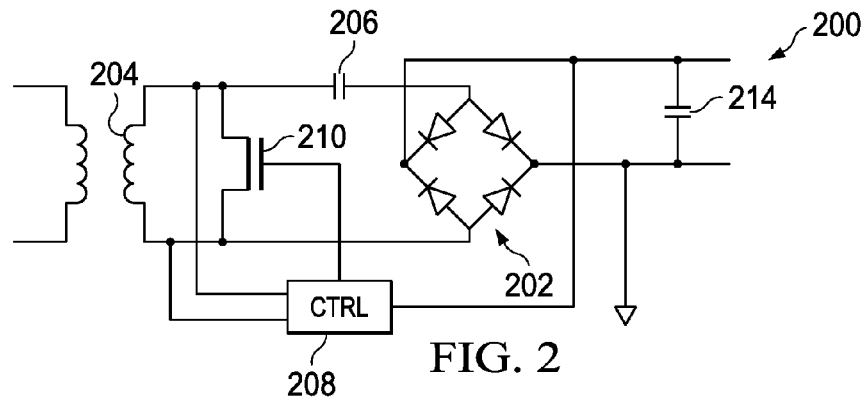
FIG. 2 is a diagram of an exemplary circuit to protect a resonant wireless power receiver from over-voltages by shorting the coil to keep the rectified voltage to safe levels.

FIG. 2 is a diagram of an exemplary wireless power receiver 200 to protect a resonant wireless power receiver from over-voltages by shorting the coil to keep the rectified voltage to safe levels. Wireless power receiver 200 includes bridge rectifier 202, a resonant antenna system formed by inductance 204 and capacitance 206, controller 208, which is configured to sense a magnitude of an AC input voltage across inductance 204, and switch 210, which connects and disconnects a capacitive element 214. The resonant antenna system can be attenuated by detuning through changing the center frequency of the LC circuit, by reducing the gain, by lowering the resistance value or in other suitable manners. Controller 208 includes a voltage sensing mechanism on the secondary side of the rectifier, and can be configured such that when the sensed voltage reaches a predetermined threshold, a feedback mechanism is enabled to adjust the capacitive value to detune the resonant antenna system, to adjust a capacitor divider which both reduces gain and detunes the output, or which performs other suitable functions. Other implementations of this type of feedback mechanism can be used to adjust gain, alter a resonant frequency, or to implement other suitable functions.

Implementations of wireless power receiver 200 can use a suitable feedback mechanism with active components, passive components, capacitive elements, inductive elements, resistive elements or other suitable elements, circuits or systems.

Figure 3:
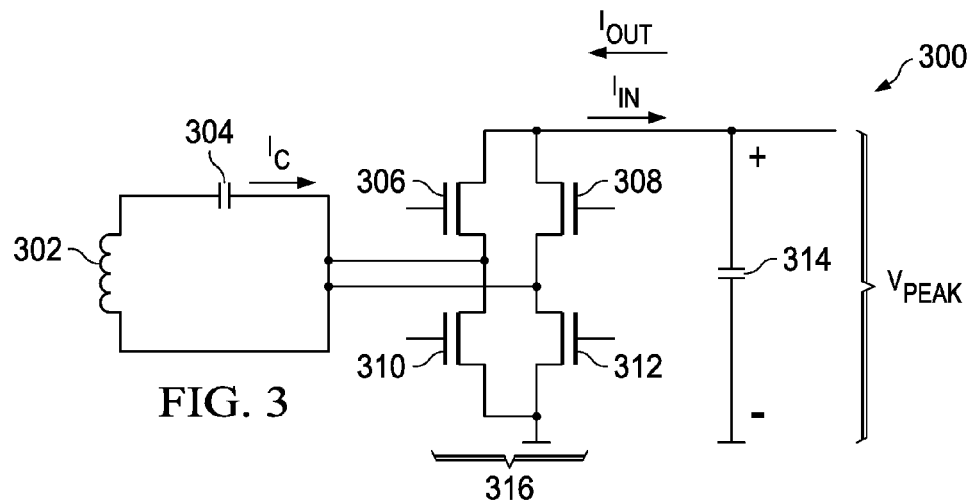
FIG. 3 is a diagram of a system for providing a full-synchronous bridge as a rectifier in wireless power circuits, in accordance with an exemplary embodiment of the present disclosure.

FIG. 3 is a diagram of a system 300 for providing a full-synchronous bridge as a rectifier in wireless power circuits, in accordance with an exemplary embodiment of the present disclosure. The full-synchronous bridge can be used to protect the wireless power receiver from overvoltages by changing the switching angle of the bridge away from the current zero-crossing point without the need for additional components. System 300 changes a switching angle of a switching bridge 316 away from the current zero crossing point. For example, when switching bridge 316 is switching transistors 306, 308, 310 and 312 when the current is synchronous with the input AC waveform, 100% of the current $I_C$ generated in the resonant circuit flows into the storage capacitor 314, increasing its voltage. By moving the switching point away from the zero-crossing of the AC waveform, a portion of the current flows from storage capacitor 314 back into the resonant circuit formed by inductor 302 and capacitor 304, reducing the capacitor voltage. Shifting the bridge switching point 90 degrees from the current zero crossing point causes an equal amount of current to flow into and out of the storage capacitor 314 as the bridge switches 306, 308, 310 and 312, keeping the capacitor voltage constant. Dynamically moving the bridge switching point allows system 300 to prevent a voltage $V_{PEAK}$ from exceeding a predetermined threshold and to maintain that voltage until the energy in the resonant circuit dissipates to a safe level.

In one exemplary embodiment, a voltage sensing mechanism can be used on a secondary side of the rectifier. Once the sensed voltage reaches a predetermined threshold, a feedback mechanism can be enabled to change the switching point for the synchronous rectifier. When the secondary voltage falls below the threshold, the feedback mechanism can move the switching point to a previous operating point or other suitable points.

Figure 4:
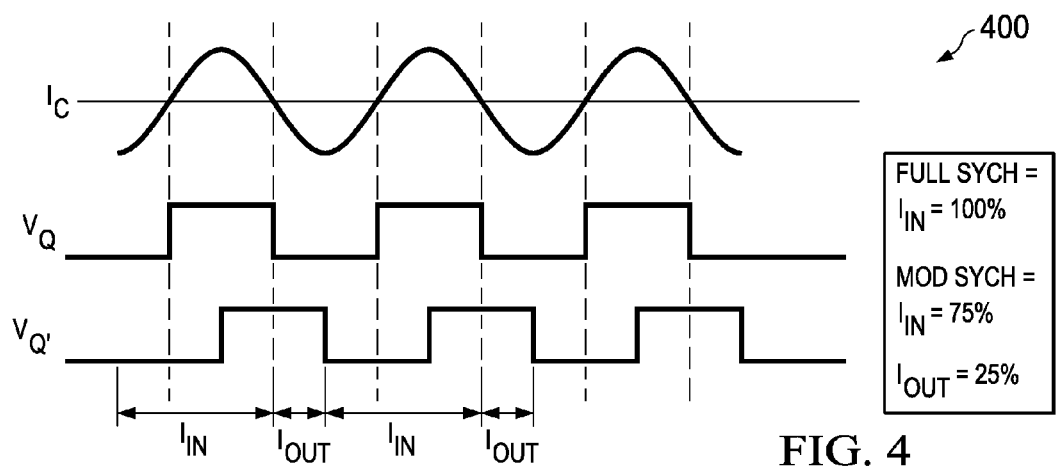
FIG. 4 is a diagram of current and timing waveforms, in accordance with an exemplary embodiment of the present disclosure.

FIG. 4 is a diagram 400 of current and timing waveforms, in accordance with an exemplary embodiment of the present disclosure. Diagram 400 includes current waveform $I_C$, which has zero crossing points that correlate to the transition times of a clock signal $V_Q$. By shifting clock switching times to the waveform shown as $V_Q$, it can be seen that a period of time in which $I_{IN}$ switches to $I_{OUT}$ for system 300 is created.

FIG. 5 is a diagram of a system 500 that is configured to resonate at two different frequencies, in accordance with an exemplary embodiment of the present disclosure. System 500 measures the DC voltage and current at the rectifier 504 output, and controller 502 causes switches S1 through Sn to switch capacitive elements C1 through Cn in parallel and series with the exemplary inductances and capacitance as shown, to control the power output of the rectifier to load elements 506A and 506B. The number of capacitive elements and corresponding switches can be used to control the tunable range and accuracy of system 500. Alternatively, other types of passive devices can be used for tuning and gain adjustment such as resistors, inductors, capacitors and others.

In a resonant system, both the transmitting and receiving entities can be tuned so that both sides resonate at the same frequency, thus maximizing power transfer. Tuning can be accomplished by switching capacitive elements into or out of the antenna circuits using high-bandwidth low-loss switches. The DC current of an associated bridge rectifier output can be measured using a current sense amplifier or in other suitable manners, and the current measurement can then be maximized by switching capacitive elements into or out of the resonating circuit, or in other suitable manners.

FIG. 6 is a diagram of a system 600 with a step-down DC/DC switching converter, in accordance with an exemplary embodiment of the present disclosure. Buck DC/DC switching converter 606 regulates the output of rectifier bridge 604 to the load. The measurement of output current $I_{OUT}$ can performed at the output of buck 606, rather than at the output of rectifier 604, and this current measurement can be used in the tuning algorithm that chooses the tuning and gain adjustment elements to switch in to or out of the circuit formed by capacitors C1 through Cn and the other exemplary capacitive and inductive elements as shown. Alternatively, controller 602 can provide step-up control, step-down control, linear control, a combination of switching and linear control or other suitable controls. Switching tuning capacitor elements C1 through Cn or other suitable elements in the resonant circuit of system 600 can also or alternatively be used to increase the transmitter to receiver antenna-to-antenna separation range on a magnetic induction power transfer system by tuning the receiver to a resonance mode, as a function of the transmitter frequency.

Figure 7:
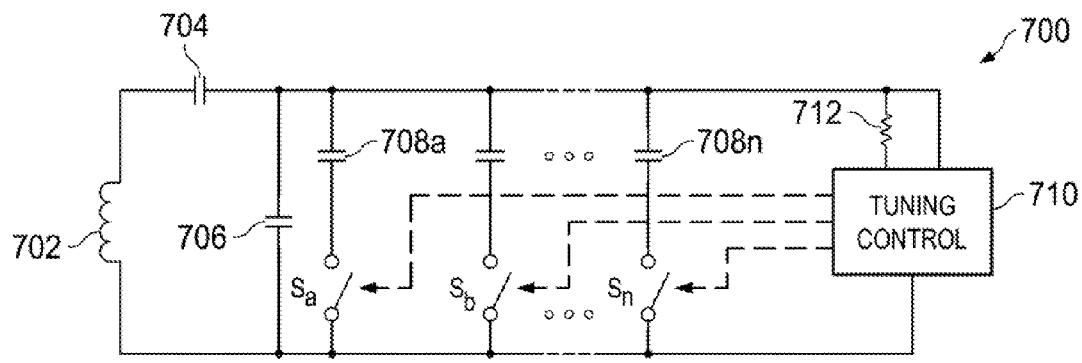
FIG. 7 is a diagram of a system with a passive resonator that acts as a repeater in a magnetic resonant power transfer system, in accordance with an exemplary embodiment of the present disclosure.

FIG. 7 is a diagram of a system 700 with a passive resonator that acts as a repeater in a magnetic resonant power transfer system, in accordance with an exemplary embodiment of the present disclosure. The passive resonator of system 700 is constructed similar to the primary transmitter resonant antenna circuit. System 700 can be located within a magnetic flux field generated by an active transmitter, which can then be excited by that magnetic field to enable power and data transfer over a broader spatial range than in a system with a non-resonant transmitter antenna alone. Tuning controller 710 can be powered by a captive supply, by scavenging energy from the power transfer system or in other suitable manners. System 700 can be tuned to resonate at a frequency of a transmitter by switching capacitive elements 708A through 708N as a function of measured current or power. By maximizing the measured current or power, a tuning algorithm can choose the correct combination of capacitive elements 708A through 708N to include in the resonant circuit. For example, a simple search algorithm can be implemented that starts with the lowest capacitance value for the combination of capacitors, and which then increases the capacitance value by the smallest next step, until a peak measured current or power is detected, such as by comparing a current or power measurement from a prior setting to a current or power measurement for a present setting, and stopping the search process when the current or power measurement starts to decrease. In another exemplary embodiment, a binary search algorithm, a linear search algorithm, an asymptotic search algorithm, a geometric search algorithm, or other suitable search algorithms can also or alternatively be utilized.

FIG. 7 is a diagram of a system 700 with a passive resonator that acts as a repeater in a magnetic resonant power transfer system, in accordance with an exemplary embodiment of the present disclosure. The passive resonator of system 700 is constructed similar to the primary transmitter resonant antenna circuit, and includes inductor 702, capacitors 704 and 706 and resistor 712. System 700 can be located within a magnetic flux field generated by an active transmitter, which can then be excited by that magnetic field to enable power and data transfer over a broader spatial range than in a system with a non-resonant transmitter antenna alone. Tuning controller 710 can be powered by a captive supply, by scavenging energy from the power transfer system or in other suitable manners. System 700 can be tuned to resonate at a frequency of a transmitter by switching capacitive elements 708A through 708N as a function of measured current or power. By maximizing the measured current or power, a tuning algorithm can choose the correct combination of capacitive elements 708A through 708N to include in the resonant circuit. For example, a simple search algorithm can be implemented that starts with the lowest capacitance value for the combination of capacitors, and which then increases the capacitance value by the smallest next step, until a peak measured current or power is detected, such as by comparing a current or power measurement from a prior setting to a current or power measurement for a present setting, and stopping the search process when the current or power measurement starts to decrease. In another exemplary embodiment, a binary search algorithm, a linear search algorithm, an asymptotic search algorithm, a geometric search algorithm, or other suitable search algorithms can also or alternatively be utilized.

Figure 8:
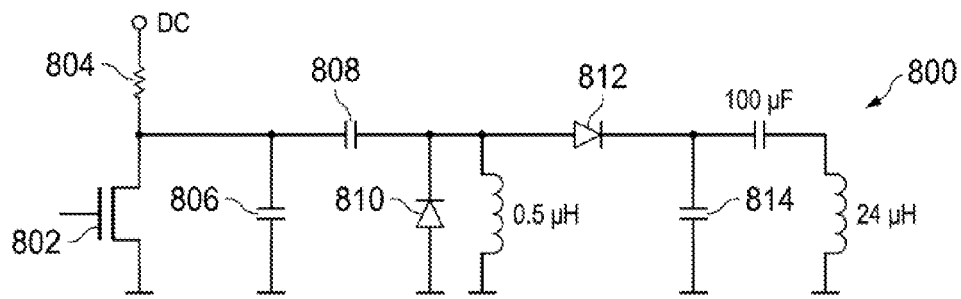
FIG. 8 is a diagram a class E transmitter, in accordance with an exemplary embodiment of the present disclosure.
Figure 9:
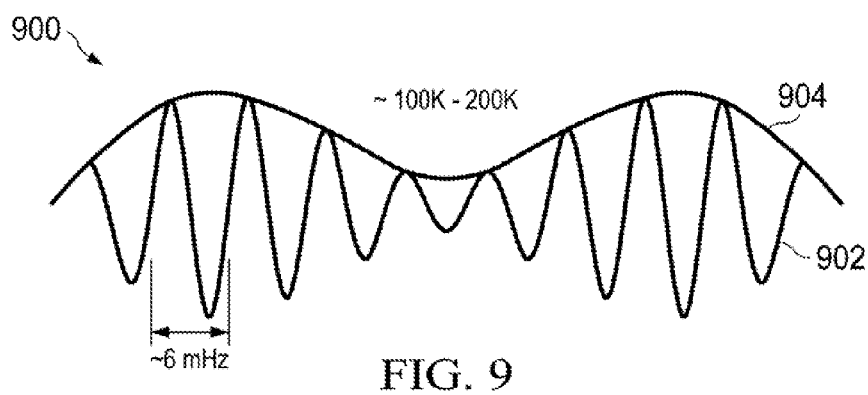
FIG. 9 is a diagram of an AC current waveform generated by class E transmitter.

FIG. 8 is a diagram a class E transmitter 800, in accordance with an exemplary embodiment of the present disclosure. Class E transmitter 800 can be used to transmit power to a low-frequency magnetic induction receiver, a higher-frequency electro magnetic resonance receiver or other suitable receivers. In this exemplary embodiment, class E transmitter 800 has two different antenna elements—a 0.5 uH inductive element for low frequency signals, and a 24 uH inductive element for high frequency signals, but other suitable circuit elements can also or alternatively be used. Also shown are transistor 802, resistor 804, capacitor 806, capacitor 808, diode 810, diode 812 and capacitor 814.

Figure 10A:
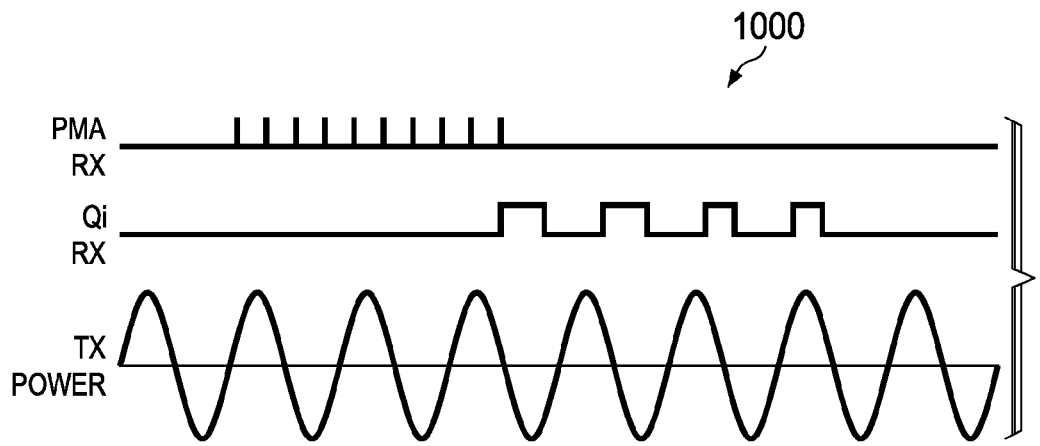
FIG. 10A is a diagram of exemplary waveforms for receiver type detection, in accordance with an exemplary embodiment of the present disclosure.

FIG. 10A is a diagram 1000 of exemplary waveforms for receiver type detection, in accordance with an exemplary embodiment of the present disclosure. The PMA RX signal is an exemplary communication from a PMA receiver. The Qi receiver signal is an exemplary communication from a Qi receiver. The transmitter power signal is an exemplary presence of wireless power (ping sequence) as a sine wave of a high frequency. In normal operation, only one of the receivers will be sending the signal. The transmitter selects the standard used by the receiver by looking at the communication during the ping sequence.

Figure 10B:
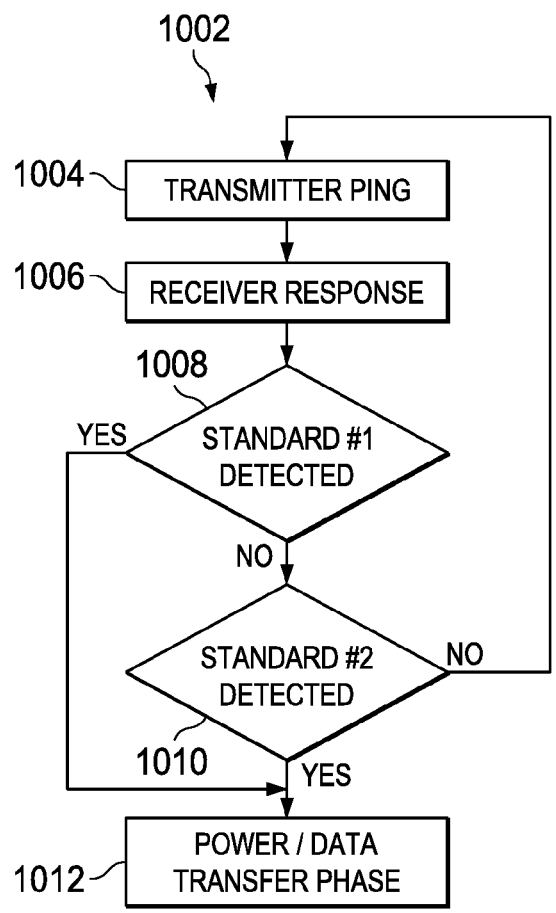
FIG. 10B is a diagram of a single-ping algorithm for receiver type detection, in accordance with an exemplary embodiment of the present disclosure.

FIG. 10B is a diagram of a single-ping algorithm 1002 for receiver type detection, in accordance with an exemplary embodiment of the present disclosure. Algorithm 1002 can be implemented in hardware or a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

At 1004, a transmitter broadcasts a ping compatible with multiple protocols, such as the TX POWER waveform. The transmitter can be operated by a suitable controller, such as by using digital controls from a programmable controller, an application-specific integrated circuit, a field programmable gate array or other suitable devices. The algorithm then proceeds to 1006.

At 1006, one or more receiver responses are detected, such as the PMA or Qi waveforms of FIG. 10A or other suitable responses. The responses can be detected by monitoring a voltage detected at a receiver circuit or in other suitable manners. The algorithm then proceeds to 1008.

At 1008, it is determined whether a response in accordance with a first standard has been received, such as by comparing a measured voltage to a first voltage waveform stored in memory or in other suitable manners. If a response in accordance with the first standard has been received, the algorithm proceeds to 1012, where a first power or data transfer phase setting is implemented, such as by selecting a first predetermined switch setting for capacitive element control switches, as discussed herein, or in other suitable manners. Otherwise, the algorithm proceeds to response 1010.

At 1010, it is determined whether a response in accordance with a second standard has been received, such as by comparing a measured voltage to a second voltage waveform stored in memory or in other suitable manners. If a response in accordance with the second standard has been received, the algorithm proceeds to 1012, where a second power or data transfer phase setting is implemented, such as by selecting a second predetermined switch setting for capacitive element control switches, as discussed herein, or in other suitable manners. Otherwise, the algorithm returns to 1004. Likewise, other suitable detection processes can be used for other suitable standards.

Based on the detected data, the transmitter adjusts its transmission configuration to complement the detected receiver protocol. A true multi-mode wireless power transmitter can be constructed to dynamically change its operating point according to the protocol of the receiver presented. The transmitter can interrogate the receiver by broadcasting a ping and receiving a response that informs the transmitter the type of receiver that is present. A single ping that works for more than one standard, multiple pings that each correspond to a different standard, or other suitable processes can also or alternatively be used.

Figure 11:
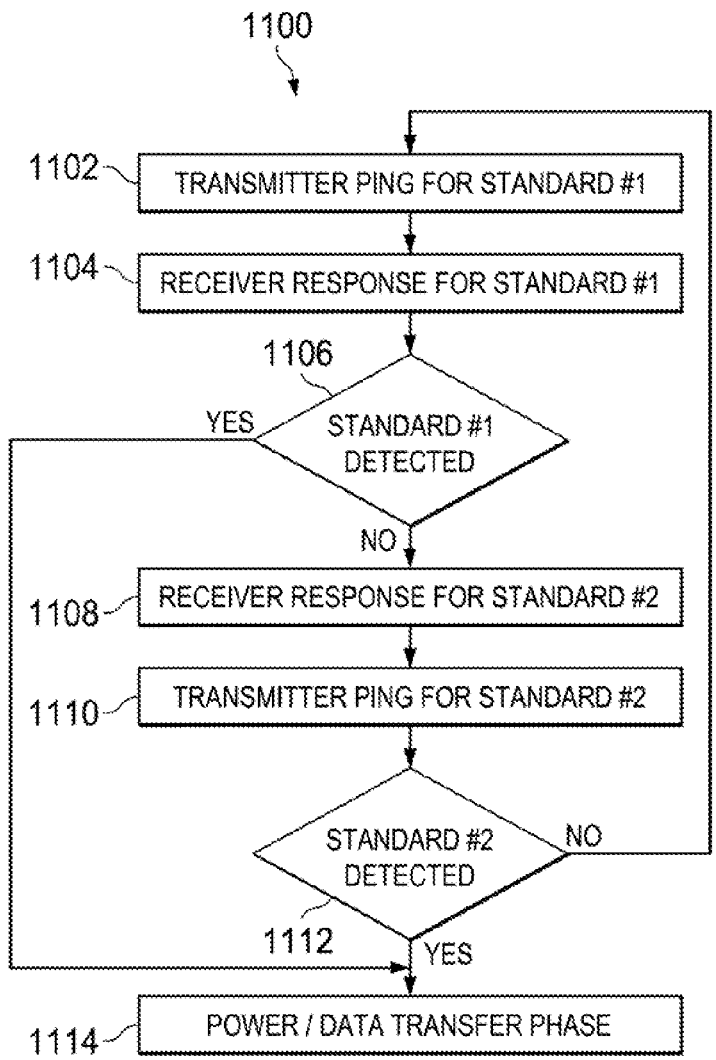
FIG. 11 is a diagram of a multi-ping algorithm for receiver type detection, in accordance with an exemplary embodiment of the present disclosure.

FIG. 11 is a diagram of a multi-ping algorithm 1100 for receiver type detection, in accordance with an exemplary embodiment of the present disclosure. Algorithm 1002 can be implemented in hardware or a suitable combination of hardware and software.

Algorithm 1100 begins at 1102, where a transmitter broadcasts a separate ping for a first standard or protocol. In one exemplary embodiment, the transmitter can be connected to a controller using a digital data communications medium, and can receive one or more digital controls that cause associated circuitry to generate a first waveform, or other suitable processes can also or alternatively be used. The algorithm then proceeds to 1104.

At 1104, the controller monitors signals generated by a receiver for a response. In one exemplary embodiment, the controller can be connected to the receiver using a digital data communications medium, and can transmit one or more analog or digital controls that are processed by the controller to detect a response, such as by comparing the received signal to an allowable received signal or in other suitable manners. The algorithm then proceeds to 1106.

At 1106, it is determined whether a correct response was received. If a correct response was not received, the algorithm proceeds to 1108, otherwise the algorithm proceeds to 1114, where a power or data transfer phase is selected to adjust a transmission configuration to complement the receiver requirement.

At 1108, a transmitter broadcasts a separate ping for a second standard or protocol. The algorithm then proceeds to 1010, where the controller monitors signals generated by a receiver for a response. The algorithm then proceeds to 1112.

At 1112, it is determined whether a correct response was received. If a correct response was not received, the algorithm returns to 1102, otherwise the algorithm proceeds to 1114, where a power or data transfer phase is selected to adjust a transmission configuration to complement the receiver requirement.

The single-ping or multi-ping algorithm can be used for both magnetic induction and magnetic resonance systems. Alternatively, the receiver can broadcast data to the transmitter, and upon receiving a response, change its configuration to match the capability of the transmitter. Alternatively, the device may be a transceiver that interrogates through a ping to adjust its configuration to be either a transmitter or receiver, and what type of protocol the complementary device can support. Additionally, other elements can be adjusted, such as power, voltage, foreign object detection characteristics, thermal requirements, data rate, and physical antenna separation.

In order to manage and ensure safe voltages at the receiver-rectified voltage during a transmitter ping phase, the configuration of the transmitter bridge can be switched during an initial ping and receiver wake-up period. For a wireless power protocol or standard that requires higher voltages for receiver wake-up, the transmitter power section can be started in a half-bridge configuration for the initial ping(s). If the half-bridge pings are not sufficient to wake up the receiver, then the bridge can be configured in full-bridge mode at an appropriate duty cycle. This algorithm also allows the half-bridge and full-bridge pings to be performed at the same frequency, in order to comply with standards requirements. This bridge switching behavior allows true multi-standard transmitter operation with a wide variety of receiver configurations, while simultaneously ensuring safe voltage levels on the receiver to prevent damage.

For demodulating the communication from the receiver to transmitter in a magnetic inductive system, such as one that conforms to the Power Matters Alliance (PMA) standard, the transmit coil voltage waveform is sampled. Multiple samples are taken during a first period and are stored in a buffer. The values of these samples are compared to samples taken at previous periods. If the samples of the current period are different than the previous samples, then a demodulation algorithm can trigger a change in a transmit state, which can direct a control algorithm to measure a pulse between disturbances. The length of this pulse can be used to determine whether to increase or reduce the current into the transmit coil, and therefore the power output of the transmitter.

Figure 12:
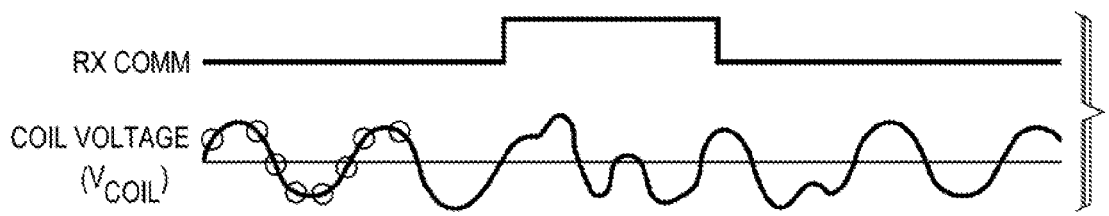
FIG. 12 shows one of the possible types of waveforms of the receive communication and transmit coil voltage during communication.

FIG. 12 shows one of the possible types of waveforms of the receive communication and transmit coil voltage during communication. The periodic waveform of the transmitter coil voltage is disturbed by a communication pulse sent by the receiver. The waveform looks similar to a sine wave before the pulse but gets distorted to a random waveform for a certain period of time after the pulse, after which it slowly recovers and comes back to the sine-like waveform.

Figure 13:
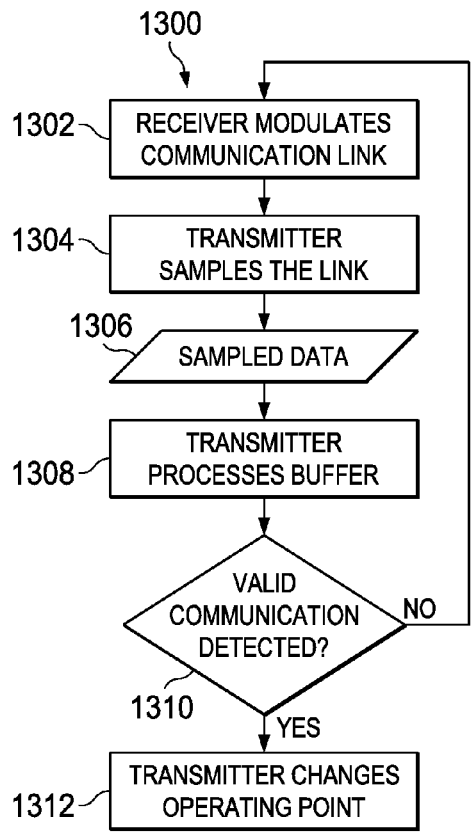
FIG. 13 is a diagram of a demodulation algorithm, in accordance with an exemplary embodiment of the present disclosure.

FIG. 13 is a diagram of a demodulation algorithm 1300, in accordance with an exemplary embodiment of the present disclosure. Algorithm 1300 can be implemented in hardware or a suitable combination of hardware and software.

Algorithm 1300 can be used for demodulating a communication from a receiver to a transmitter in a magnetic inductive system, such as one that conforms to the Wireless Power Consortium (Qi®) standard, where sub-Nyquist sampling of the transmit AC coil voltage is performed at a particular frequency, and which is then averaged in order to determine amplitude and phase changes on the carrier.

Algorithm 1300 begins at 1302, where a receiver modulates a communication link. In one exemplary embodiment, the receiver can be coupled to a digital controller and can receive one or more digital control signals that cause the communications link to be modulated in accordance with one or more frequency or data parameters. The algorithm then proceeds to 1304.

At 1304, the transmitter samples the communications link, such as by receiving one or more analog samples and by converting the analog samples to digital values, or in other suitable manners. The algorithm then proceeds to 1306.

At 1306, the sampled data is processed, such as by storing the data in a buffer or in other suitable manners. The algorithm then proceeds to 1308.

At 1308, the transmitter processes the buffered data, such as by comparing the buffered data to data from a previous period, to a stored waveform or in other suitable manners. The algorithm then proceeds to 1310.

At 1310, it is determined whether a valid communication has been detected. If a valid communication has not been detected, the algorithm returns to 1302, otherwise the algorithm proceeds to 1312.

At 1312, the transmitter changes an operating point.

Figure 14:
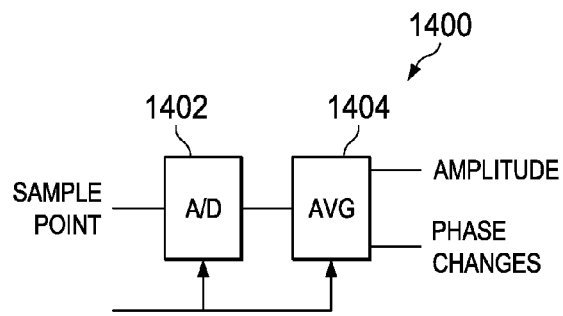
FIG. 14 is a diagram of a system for processing data, in accordance with an exemplary embodiment of the present disclosure.

FIG. 14 is a diagram of a system 1400 for processing data, in accordance with an exemplary embodiment of the present disclosure. System 1400 includes analog to digital converter 1402 and averager 1404. The sampling points input into analog to digital converter 1402 are taken at predetermined points on an input waveform. Because the system continuously samples these known points, it requires less sampling and processing resources to perform the demodulation, which reduces the overall complexity and cost of the system. An averager can generate average value data for determining amplitude or phase changes.

Figure 15:
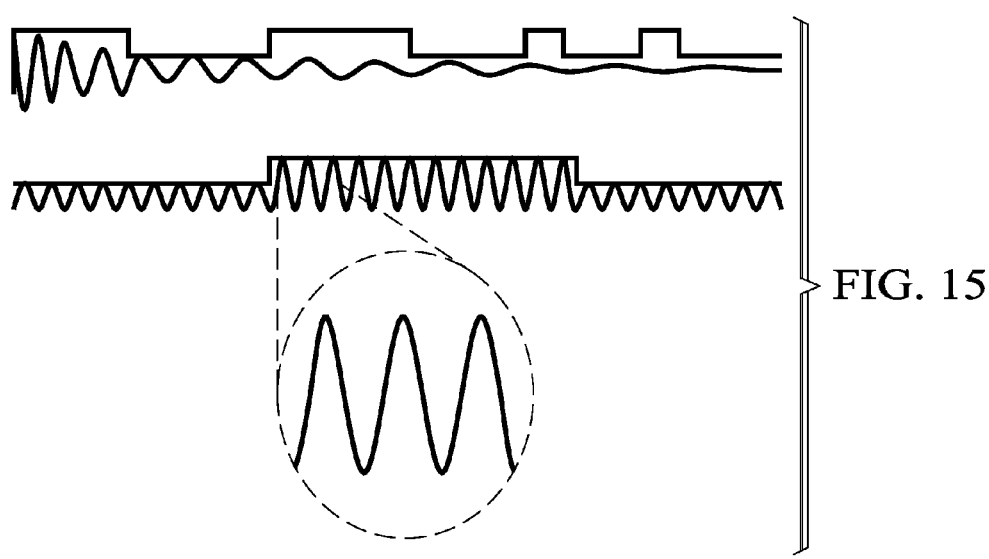
FIG. 15 shows one of the possible types of waveforms of the receive communication and transmit coil voltage during communication.

FIG. 15 shows one of the possible types of waveforms of the receive communication and transmit coil voltage during communication.

In a wireless power transfer system, bi-directional communication between a receiver and transmitter can be used for multiple purposes. Data transfer between the receiver and transmitter can be used to communicate system status and capability of each side of the interface, to ensure the transfer is accomplished at the highest efficiency and shortest charging times. Similarly, this communication can be used to aid in the detection of foreign metallic objects within the magnetic field, for receiver and transmitter authentication to ensure that only compatible devices are connected, for financial transactions between receiver and transmitter to enable pay-for-charging in public infrastructure applications, for the transmitter and receiver to negotiate the maximum power to be transferred in the system, to push advertisements to an end user, to transfer application data between a receiver and a transmitter, or for other suitable purposes.

Figure 16:
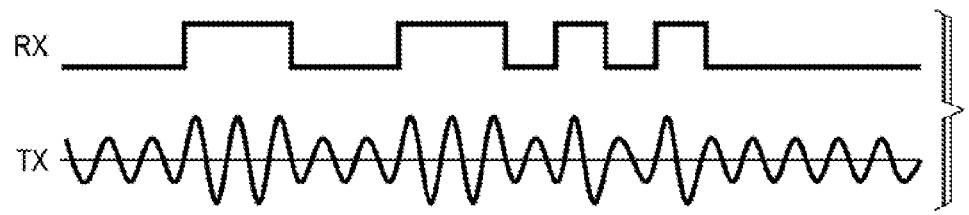
FIG. 16 is a diagram of amplitude modulation, in accordance with an exemplary embodiment of the present disclosure.

FIG. 16 is a diagram of amplitude modulation, in accordance with an exemplary embodiment of the present disclosure. The frequency of the sine wave can be increased slightly to fit more cycles inside each stable level of the receiver waveform. The frequency is the same, but the amplitude changes based on the receiver level.

Figure 17:
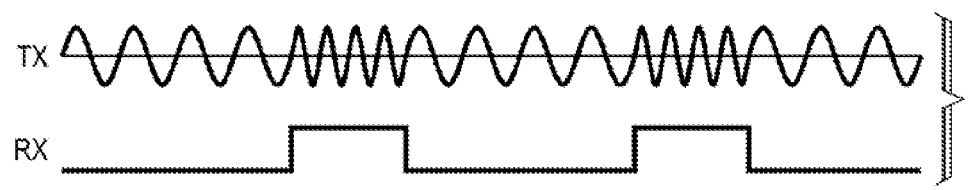
FIG. 17 is a diagram showing frequency modulation, in accordance with an exemplary embodiment of the present disclosure.

FIG. 17 is a diagram of frequency modulation, in accordance with an exemplary embodiment of the present disclosure. As shown in FIG. 17, the amplitude is the same, but the frequency is higher or lower. The receiver demodulates the signal and obtains levels of zero or one. Alternatively, this application can be used for power banks, "Internet of Things" (IoT) appliances, autonomous systems, medical/body monitoring, passive electronic systems such as credit cards or other suitable applications.

In order to regulate the output voltage of the wireless power receiving entity, a periodic communication signal can be asserted on the receiver resonant circuit. This periodic signal can be generated with a simple low-cost analog circuit to save cost and board space. The signal functions as the "heartbeat" of the system, and can signal both the need for the transmitter or receiver to change its operation point or function. Alternatively, the signal can be used for the transmitter to identify both the presence of a receiver and to authenticate a receiver, to control the function of the transmitter from the receiver, to signal to a transmitter when a receiver has an error condition or has been removed, to transfer encoded or unencoded data between two entities, or for other suitable purposes. A combination of amplitude and frequency can be used for this type of "heartbeat" communication, PSK or FSK can be used for this type of "heartbeat" communication, or other suitable data can also or alternatively be used.

Figure 18:
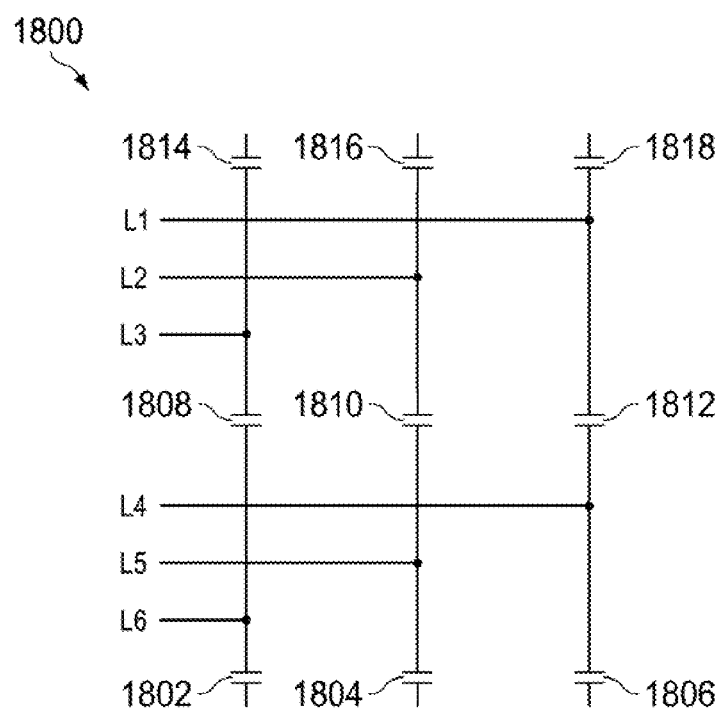
FIG. 18 is a diagram of a circuit for providing a capacitive grid that can be used to detect metallic objects, in accordance with an exemplary embodiment of the present disclosure.

FIG. 18 is a diagram of a circuit 1800 for providing a capacitive grid that can be used to detect metallic objects, in accordance with an exemplary embodiment of the present disclosure. Circuit 1800 includes leads L1 through L6, which are each coupled to a pair of capacitors. Other sensing arrays or grids can be used with other passive or active devices. Also shown is capacitors 1802-1818.

Foreign metallic objects can be detected within the magnetic field of a wireless power transfer system using an array of capacitive sensors placed above or near the transmit antenna. The capacitive sensors can be arranged in an X-Y grid so they can be combined into rows and columns to reduce the number of connections to the control circuitry. When a change is detected in one or more of the capacitive sensors, a foreign object is detected in the field and the transmitter can act appropriately.

Similarly, foreign metallic objects can be detected within the magnetic field of a multi-mode magnetic inductive and magnetic resonant wireless power transfer system using the inactive antenna. If the magnetic inductive interface is active, a change in the impedance of the magnetic resonant antenna would signal that a foreign object has entered the magnetic field and the transmitter can act appropriately. Likewise, the magnetic inductive antenna could be used to sense objects in the magnetic resonant field when active.

The receiver coil and bridge rectifier in a wireless power receiver can also be used to emulate a synchronous step-up (boost) circuit to increase the voltage output of the rectifier. Similarly, the receiver coil and bridge rectifier in a wireless power receiver can also be used to emulate a synchronous step-down (buck) circuit to decrease the voltage output of the rectifier.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A wireless device comprising:
    an antenna system comprising at least one inductive element and two or more capacitive elements;
    a switching component configured to change a circuit configuration of the capacitive elements; and
    a controller configured to transmit a signal using the antenna system and to receive a response from a first device, to determine a communications protocol associated with the first device and to change a configuration of the antenna system in response to the determined communications protocol by actuating the switching component, wherein the controller is configured to transmit a first signal in accordance with a first protocol and to wait a predetermined period of time for a response, and then to transmit a second signal in accordance with a second protocol if no response is received.

2. The wireless device of claim 1 wherein the controller is configured to detect whether the first device is within proximity to the controller and to transmit the signal in response to the detection.

3. The wireless device of claim 1 wherein the controller is configured to transmit additional signals in accordance with additional protocols until a response is received.

4. A wireless device of claim 1 wherein the controller is configured to maximize a power transfer or efficiency by tuning a transmitting entity and a receiving entity to each resonate at a frequency.

5. The wireless device of claim 1 wherein the switching component comprises one or more high-bandwidth, low-loss switches, and further comprising a device configured to measure one of a voltage, a current or a power in the device, and wherein the controller is configured to actuate the switches as a function of the measured voltage, current or power in the device.

6. The wireless device of claim 1 wherein the controller is configured to transmit a signal that can generate a response in accordance with multiple different protocols.

7. A method comprising:
    transmitting a signal to an antenna system comprising at least one inductive element and two or more capacitive elements;
    receiving a response from a first device at a controller;
    determining a communications protocol associated with the first device at the controller; and
    changing a configuration of the antenna system at the controller in response to the determined communications protocol by actuating a switching component configured to change a circuit configuration of the capacitive elements;

transmitting a first signal in accordance with a first protocol from the controller;

waiting a predetermined period of time for a response; and transmitting a second signal in accordance with a second protocol from the controller if no response is received.

8. The method of claim 7 further comprising:

detecting whether the first device is within proximity to the controller; and transmitting the first signal in response to the detection.

9. The method claim 7 further comprising transmitting additional signals in accordance with additional protocols until a response is received.

10. The method of claim 7 further comprising maximizing a power transfer or efficiency by tuning a transmitting entity and a receiving entity to each resonate at a frequency.

11. The method of claim 7 further comprising transmitting a signal that can generate a response in accordance with multiple different protocols.

12. The method of claim 7 further comprising detecting whether the first device is within proximity to the controller.

13. The method of claim 7 further comprising:

measuring one of a voltage, a current or a power in the first device; and actuating the switching component as a function of the measured voltage, current or power in the first device.

14. The method of claim 13 wherein the switching component comprises one or more high-bandwidth, low-loss switches.

15. The method of claim 7 further comprising:

measuring one of a voltage, a current or a power in the first device; and actuating the switching component after measuring.

16. The method of claim 15 wherein the switching component comprises one or more high-bandwidth, low-loss switches.

* * * * *

UNITED STATES PATENT AND TRADEMARK OFFICE
CERTIFICATE OF CORRECTION

PATENT NO. : 9,787,364 B2
APPLICATION NO. : 14/814379
DATED : October 10, 2017
INVENTOR(S) : Kenneth E. Moore et al.

It is certified that error appears in the above-identified patent and that said Letters Patent is hereby corrected as shown below:

In the Claims

1. In Column 12, Line 45, in Claim 4, delete "A" and insert -- The --, therefor.

2. In Column 12, Line 65, in Claim 7, delete "controller; and" and insert -- controller; --, therefor.

3. In Column 13, Line 15, in Claim 9, delete "method" and insert -- method of --, therefor.

Signed and Sealed this
Thirteenth Day of February, 2018

Andrei Iancu
*Director of the United States Patent and Trademark Office*